(12) United States Patent
Pratt et al.

(10) Patent No.: US 6,621,091 B2
(45) Date of Patent: Sep. 16, 2003

(54) WORKPIECE ENCLOSURE AND PROCESSING SYSTEM

(75) Inventors: Vanon David Pratt, Blanchester, OH (US); Lorne Weeter, Springboro, OH (US)

(73) Assignee: Motoman, Inc., West Carrollton, OH (US)

( * ) Notice: Subject to any disclaimer, the term of this patent is extended or adjusted under 35 U.S.C. 154(b) by 196 days.

(21) Appl. No.: 09/880,684

(22) Filed: Jun. 13, 2001

(65) Prior Publication Data

US 2002/0002418 A1 Jan. 3, 2002

Related U.S. Application Data

(63) Continuation-in-part of application No. 09/798,698, filed on Mar. 2, 2001, now abandoned.
(60) Provisional application No. 60/186,734, filed on Mar. 3, 2000.

(51) Int. Cl.[7] .............................................. G01N 21/86
(52) U.S. Cl. ................ 250/559.33; 901/42; 219/121.82; 250/239
(58) Field of Search ........................ 250/559.33, 223 R, 250/239; 700/166; 219/121.82, 121.86, 121.22, 121.41, 121.6, 121.68; 901/6–8, 41, 42

(56) References Cited

U.S. PATENT DOCUMENTS

| 3,775,586 | A | | 11/1973 | Flint et al. |
|---|---|---|---|---|
| 4,205,216 | A | * | 5/1980 | Douglas ................ 219/121.82 |
| 5,183,993 | A | | 2/1993 | Sato et al. |
| 6,147,320 | A | * | 11/2000 | Bernecker et al. ..... 219/121.82 |
| 6,147,323 | A | | 11/2000 | Erickson et al. |
| 6,314,686 | B1 | | 11/2001 | Scherer et al. |
| 6,347,733 | B1 | | 2/2002 | Hickey, II |

* cited by examiner

Primary Examiner—Que T. Le
Assistant Examiner—Thanh X. Luu
(74) Attorney, Agent, or Firm—Killworth, Gottman, Hagan & Schaeff LLP

(57) ABSTRACT

A workpiece enclosure system of the present invention includes a workpiece loading section, a laser workstation cell, and a workpiece unloading section. The workpiece loading section includes a materials handling robot arranged to move workpieces from an input conveyor to a light-tight pass-through enclosure in communication with the laser workstation cell. The laser workstation cell includes an additional materials handling robot arranged to move workpieces from the pass-through enclosure to one of two dual headstock/tailstock positioners for laser operations. Preferably, two sets of laser-cutting robots are arranged to perform laser-cutting operations on workpieces held by the headstock/tailstock positioners. The materials handling robot is further arranged to move workpieces from the headstock/tailstock positioners to an additional pass-through enclosure in communication with the workpiece unloading section. The workpiece unloading section includes a final materials handling robot arranged to move workpieces from the additional pass-through enclosure to an output conveyor. It is contemplated that the materials handling robots may be eliminated if a user desires to manually load and unload workpieces.

20 Claims, 4 Drawing Sheets

WORKPIECE ENCLOSURE AND PROCESSING SYSTEM

CROSS-REFERENCE TO RELATED APPLICATIONS

This application is a continuation-in-part of U.S. patent application Ser. No. 09/798,698 filed Mar. 2, 2001, now abandoned, which claims the benefit of US. Provisional Application Serial No. 60/186,734, filed Mar. 3, 2000. This application is also related to U.S. patent application Ser. No. 09/878,754 filed Jun. 11 , 2001, which is a continuation-in-part of U.S. patent application Ser. No. 09/798,353 filed Mar. 2, 2001. now abandoned, which claims the benefit of U.S. Provisional Application Serial No. 60/186.736, filed Mar. 3. 2000.

BACKGROUND OF THE INVENTION

1. Field of the Invention

The present invention relates in general to laser enclosures and, more particularly, to a light-tight pass-through enclosure system for a robotic laser-cutting station that enables workpieces and workpiece processing scraps to be more conveniently managed.

2. Description of Related Art

Industrial laser workstations are known in the prior art. Such lasers workstations are commonly used for purposes of welding and cutting. U.S. and international standards have been developed which divide all industrial lasers used in the laser workstations into four major hazard categories, i.e., four broad classes (I to IV). Low power laser workstations use Class I lasers which emit laser radiation below known hazard levels. High power laser workstations use Class IV lasers that are more hazardous.

Laser enclosures for laser workstations are also known in the prior art, and are commonly used as protective enclosures for higher-powered lasers, e.g., Class II, Class III or Class IV lasers. Such laser enclosures allow the higher-powered lasers used in the laser workstations to operate in a lower classification. For example, U.S. Pat. No. 5,658,476, issued to Gullo et al, discloses a laser enclosure comprising a housing having an inner cavity in which laser operations are capable of being performed and a section having an opening through which workpieces pass into and out of the inner cavity. The enclosure further includes a workpiece positioner rotatable about a generally horizontal axis for moving workpieces from a workpiece loading and unloading zone, through the opening to a work zone within the inner cavity.

U.S. Pat. No. 5,643,477, also issued to Gullo et al, discloses a laser enclosure comprising a housing having an inner cavity in which laser operations are performed. The housing includes a first section having a first opening through which workpieces pass into and out of the inner cavity. Further provided is a first workpiece positioner for alternately moving the workpieces from a first workpiece loading/unloading zone, through the first opening to a first work zone within the inner cavity of the housing. The first workpiece positioner includes a first workpiece holder adapted to releasably receive at least one of the workpieces and is movable from the first workpiece loading/unloading zone to the first work zone as the first positioner moves from a first loading/unloading position to a first work position. The first positioner further includes a first sealing panel which sealingly mates with a first sealing portion of the first section of the housing when the first workpiece holder is located in the first workpiece loading/unloading zone. A second sealing panel which sealingly mates with a second sealing portion of the first section of the housing when the first workpiece holder is located in the first work zone.

U.S. Pat. Nos. 5,591,361, and 5,464,963, both issued to Hostler et al., disclose a protective enclosure for a laser system having a laser generator for generating and directing a laser beam to a laser workstation. The enclosure includes a housing having an inner cavity for containing the laser workstation. The housing further includes a section having an opening through which workpieces pass into and out of the inner cavity. The enclosure additionally includes a rotary turntable for moving the workpieces through the opening into and out of the inner cavity, and passive sealing members movably coupled to the section for sealing a portion of the rotary turntable with a portion of the section to inhibit laser energy from exiting the housing through the opening.

It remains, however, that the known laser enclosures are generally designed for use with standalone laser workstations. As such, the known laser enclosures have minimal interface abilities with other automated assembly line stations. This limits the efficiencies of the enclosed laser workstations. Additionally, when in operation, over time workpiece processing scraps collect around the enclosed laser workstations. To clean up the collection of workpiece processing scraps, such laser enclosures must be entered which requires shutting down the laser workstations. This delay in operation further decreases the efficiencies of such laser workstations.

As such, there remains a definite need to provide a light-tight laser workpiece enclosure that permits easy integration of the enclosed laser-cutting station(s) into an assembly line and automation of the removal of workpiece processing scraps to increase the efficiencies of the enclosed laser workstations.

SUMMARY OF THE INVENTION

The above-mentioned needs are met by the light-tight laser enclosure system of the present invention, which houses robotic laser workstations and enables the convenient management of workpieces and workpiece processing scraps. For the purposes of describing and defining the present invention, it is noted that a light-tight enclosure is an enclosure designed to prevent laser light generated within the enclosure from causing injury or damage to persons and objects outside of the enclosure. Light-tight enclosures include absolute lightproof enclosures and enclosures that contain light to a lesser degree. For example, one class of light-tight enclosures pass diffused or indirect laser light through certain portions of the enclosure (e.g., around the edge of a door, through an exhaust vent, or through a conveyor passage) but are designed such that the diffused or indirect laser light is forced to be reflected or change directions at three separate interfaces. In this manner, the path from a potentially hazardous light source to an object, i.e., the pupil of a person's eye, is interrupted by at least three different surfaces, which reduce the energy density of the light and minimize the potential danger associated with the emission of laser light.

The workpiece enclosure system of the present invention includes a workpiece loading section, a laser workstation cell, and a workpiece unloading section. The workpiece loading section includes a materials handling robot arranged to move workpieces from an input conveyor to a light-tight pass-through enclosure in communication with the laser workstation cell. The laser workstation cell includes an additional materials handling robot arranged to move workpieces from the pass-through enclosure to one of two dual headstock/tailstock positioners for laser operations, such as cutting and/or welding. Preferably, two sets of laser-cutting robots are arranged to perform laser-cutting operations on workpieces held by the headstock/tailstock positioners. The materials handling robot is further arranged to move workpieces from the headstock/tailstock positioners to an additional pass-through enclosure in communication with the workpiece unloading section. The workpiece unloading section includes a final materials handling robot arranged to move workpieces from the additional pass-through enclosure to an output conveyor. It is contemplated that the external materials handling robots may be eliminated if a user desires to manually load and unload workpieces.

In accordance with one embodiment of the invention, provided is a workpiece enclosure system for use with robotic workstations configured to perform laser operations on workpieces. The workpiece enclosure system comprises first and second light-tight pass-through enclosures, and a laser workstation cell having a plurality of headstock/tailstock positioners and in communication with the first and second light-tight pass-through enclosures. The workpiece enclosure system further comprises a first materials handling robot arranged to move the workpieces from the first light-tight pass-through enclosure to one of the plurality of headstock/tailstock positioners, and arranged to move the workpieces from the headstock/tailstock positioners to the second pass-through enclosure.

In accordance with another embodiment of the invention, provided is a workpiece enclosure system for use with robotic workstations configured to perform laser operations on workpieces. The workpiece enclosure system comprises first and second light-tight pass-through enclosures, a laser workstation cell having a plurality of headstock/tailstock positioners and in communication with the first and second light-tight pass-through enclosures, and a first materials handling robot arranged to move the workpieces to the first light-tight pass-through enclosure. The workpiece enclosure system further comprises a second materials handling robot arranged to move the workpieces from the first light-tight pass-through enclosure to one of the plurality of headstock/tailstock positioners, and arranged to move the workpieces from the headstock/tailstock positioners to the second pass-through enclosure. The workpiece enclosure also comprises a third materials handling robot arranged to move the workpieces from the second light-tight pass-through enclosure.

In accordance with still another embodiment of the invention, provided is a laser-cutting system including a workpiece enclosure system comprising a workpiece loading section, and a laser workstation cell having a plurality of robotic laser-cutters. The laser-cutting system further comprises a workpiece unloading section, and a first materials handling robot arranged to move workpieces from an input conveyor to a first light-tight pass-through enclosure in communication with the laser workstation cell. The laser workstation cell includes a second materials handling robot arranged to move workpieces from the pass-through enclosure to one of two dual headstock/tailstock positioners for laser cutting by the plurality of robotic laser-cutters. The second materials handling robot is further arranged to move workpieces from the headstock/tailstock positioners to a second pass-through enclosure in communication with the workpiece unloading section. The laser-cutting system further comprises a third materials handling robot arranged to move workpieces from the second pass-through enclosure to an output conveyor.

These and other features and objects of the present invention will be apparent in light of the description of the invention embodied herein.

BRIEF DESCRIPTION OF THE SEVERAL VIEWS OF THE DRAWINGS

The following detailed description of the present invention can be best understood when read in conjunction with the following drawings, where like structure is indicated with like reference numerals and in which.

DETAILED DESCRIPTION OF THE PREFERRED EMBODIMENTS

The above-described drawing figures illustrate the invention, a light-tight pass-through workpiece enclosure system for use with laser workstations. FIGS. 1-4 illustrate the embodiments of the present invention showing the relationship between the various elements, including mechanical and robotic movement relationships.

Figure 1:
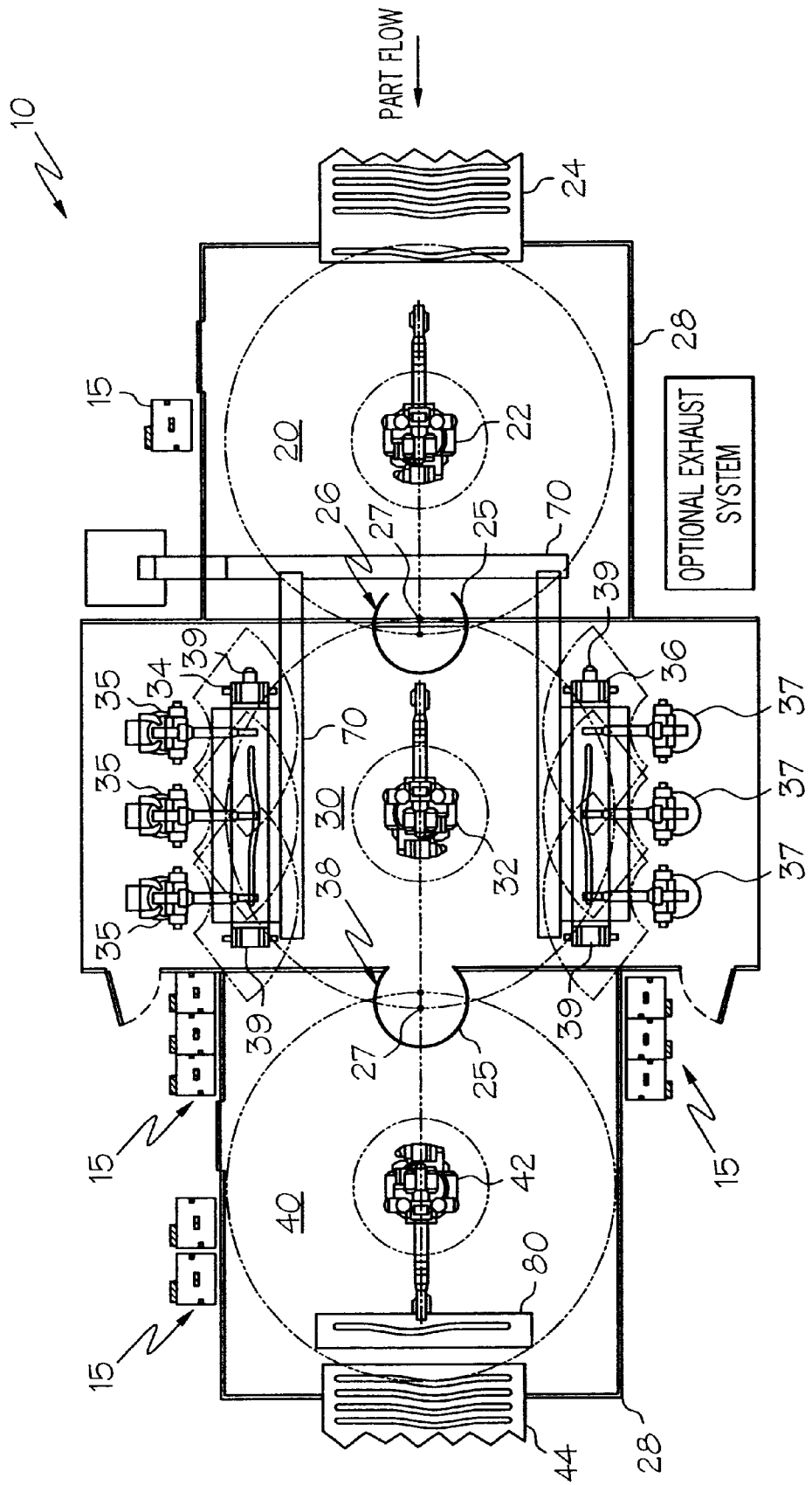
FIG. 1 is an illustration of an enclosure scheme according to the present invention.
Figure 2:
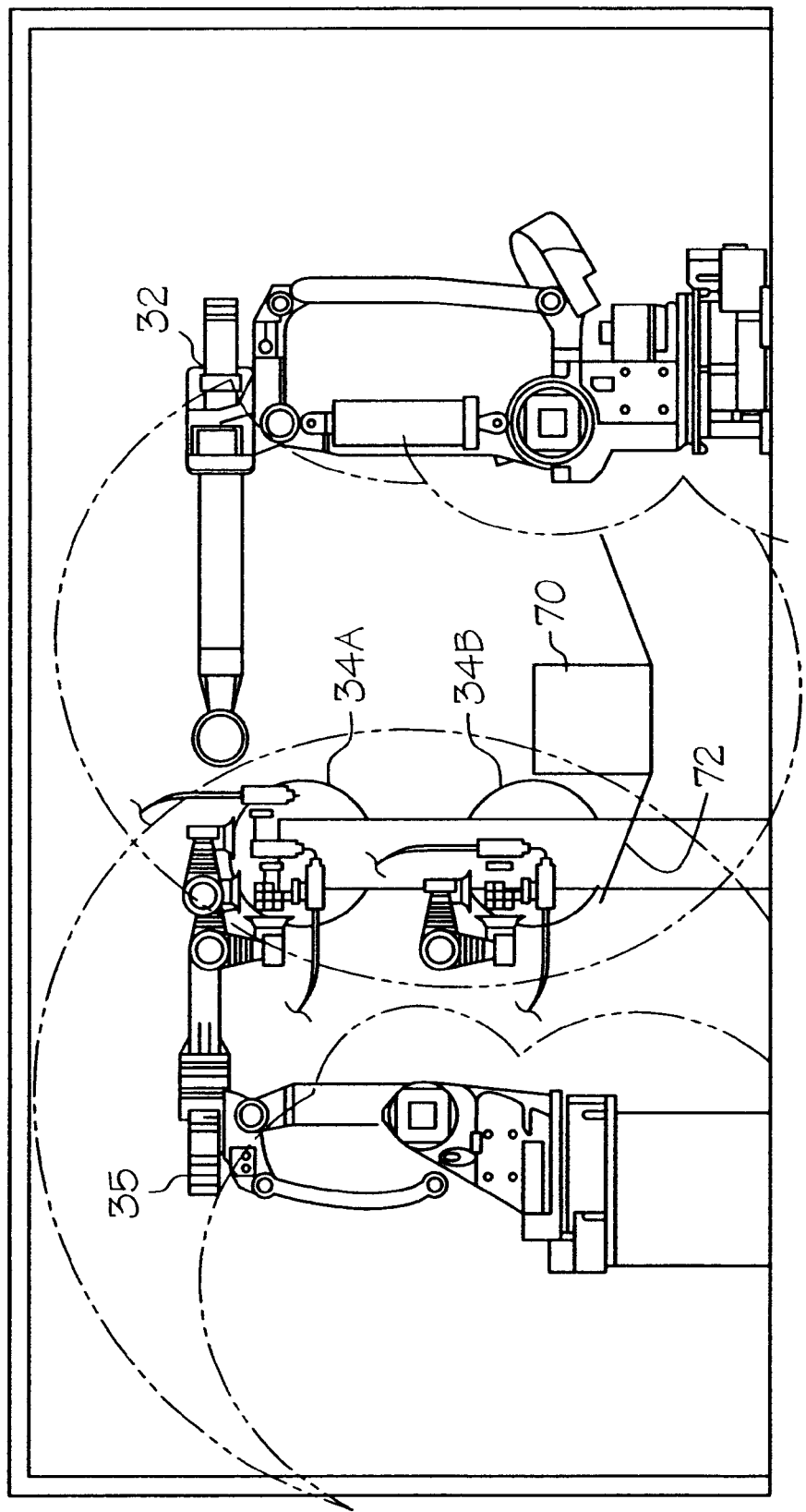
FIG. 2 is an illustration of a laser workstation cell portion of an enclosure scheme according to the present invention.

Referring now to FIGS. 1 and 2, the light-tight pass-through workpiece enclosure system 10 of the present invention includes a workpiece loading section 20, a laser workstation cell 30, and a workpiece unloading section 40. The workpiece loading section 20 includes a materials handling robot 22 arranged to move workpieces from an input conveyor 24 to a light-tight pass-through enclosure 26 in communication with the laser workstation cell 30. The laser workstation cell 30 includes an additional materials handling robot 32 arranged to move workpieces from the pass-through enclosure 26 to one of two dual headstock/tailstock positioners 34, 36 for laser operations, such as cutting and/or welding. In the illustrated embodiment, preferably two sets of laser-cutting robots 35, 37 are arranged to perform laser-cutting operations on workpieces held by the headstock/tailstock positioners 34, 36. For other embodiments, other types of robots may be used to perform another type of laser operations, such as welding, etching and the like.

The materials handling robot 32 is further arranged to move workpieces from the headstock/tailstock positioners 34, 36 to an additional pass-through enclosure 38 in communication with the workpiece unloading section 40. The workpiece unloading section 40 includes a final materials handling robot 42 arranged to move workpieces from the additional pass-through enclosure 38 to an output conveyor 44. It is contemplated that the materials handling robots 22, 42 may be eliminated if a user desires to manually load and unload workpieces.

The workpiece loading section 20 is typically surrounded by a safety fence 28 or other barrier designed to keep personnel out of the operating envelope of the materials handling robot 22. A suitable materials handling robot is available from Motoman Incorporated, under the product identifier UP130. It is contemplated by the present invention that the specific arrangement of the workpiece loading section may be varied to accommodate different types of workpieces. For example, the materials handling robot 22 and the pass-through enclosure 26 may be replaced by a light-tight conveyor system that feeds directly into the laser workstation cell 30.

As illustrated by FIG. 1, the pass-through enclosures 26, 38 each comprises conventional revolving darkroom door 25 and a fixture or transfer nest 27 for securing a workpiece within the enclosure 26, 38. The revolving darkroom door 25 is a rotating cylinder and housing with a floor and ceiling and is lightproof. The fixture or transfer nest 27 may be either stationary or rotate with the darkroom door. An alternative pass-through enclosure design according to the present invention is illustrated in FIG. 3.

Figure 3:
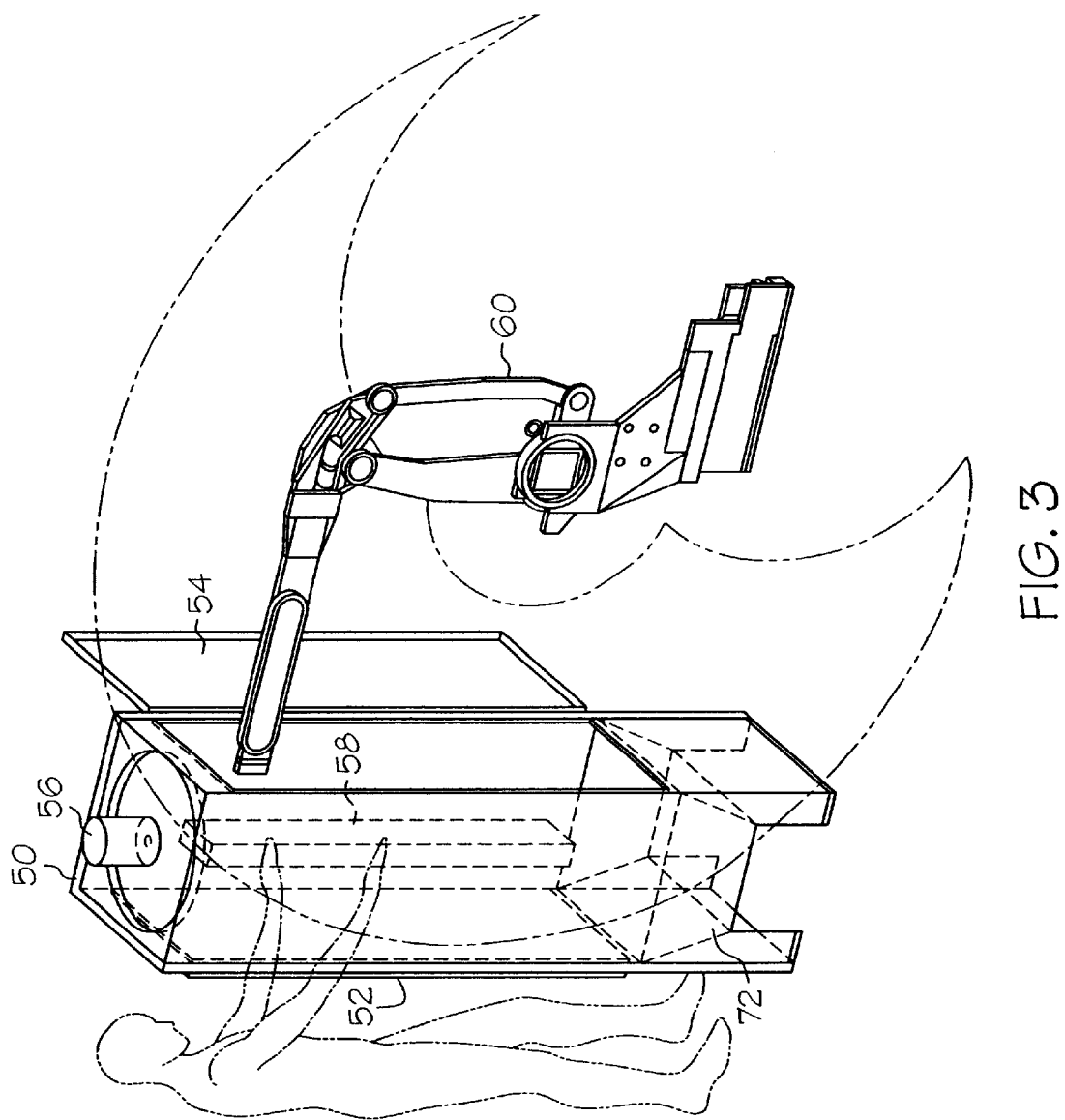
FIG. 3 is an illustration of a light-tight pass-through enclosure according to the present invention.

Referring specifically to FIG. 3, illustrated is a transfer cabinet 50 having an outer pass-through door 52, an inner pass-through door 54, and a rotary positioner 56 arranged to hold and rotatably position a workpiece 58 within the transfer cabinet 50. The workpiece 58 may either be placed in the transfer cabinet 50 by a user, as is illustrated in FIG. 3, or by a materials handling robot, as is illustrated in FIG. 1. A material-handling robot 60 is arranged to unload the workpiece 58 from the transfer cabinet 50 and move the workpiece to a specified position within the laser workstation cell 30, as is described in further detail herein.

The pass-through doors 52, 54 and the transfer cabinet 50 are constructed to preserve a light-tight barrier between the laser workstation cell and the surrounding area. In operation, the inner pass-through door 54 is maintained in a closed position as the workpiece is loaded into the transfer cabinet 50. The outer pass-through door 52 is closed once the workpiece 58 is received by the rotary positioner 56. Subsequently, the inner pass-through door 54 is opened to allow the material-handling robot 60 to access the workpiece 58. It is contemplated by the present invention that the transfer cabinet 50 illustrated in FIG. 3 may have applications outside of those specifically discussed here. For example, the material-handling robot 60 could be replaced by a laser-cutting robot and the transfer cabinet 50 could be used to present a workpiece for processing by the laser-cutting robot. As will be appreciated by those practicing the present invention, an additional scrap chute and scrap conveyor assembly should be provided in the proximity of the potential additional laser-cutting robot.

Referring to FIGS. 1 and 2, the arrangement of the dual headstock/tailstock positioners 34, 36 of the laser workstation cell 30 is illustrated in detail. In FIG. 2, reference is merely made to the materials handling robot 32, one of the dual headstock/tailstock positioners 34, and a single laser-cutting robot 35. The dual headstock/tailstock positioner 34 is arranged to support one workpiece in an upper workpiece position 34A between a first set of workpiece supports 39 and to support an additional workpiece in a lower workpiece position 34B between a second set workpiece supports (not shown). In this manner, processing dead time during positioner sweep may be eliminated by performing laser-cutting operations on one workpiece in a selected workpiece position while the other workpiece is being removed from or positioned between the workpiece supports of the other workpiece position.

A scrap conveyor 70 and a scrap chute 72 are provided to receive scrap material generated during the laser-cutting operation and convey the scrap material to the exterior of the laser workstation cell 30. The conveyor 70 is provided with a suitable light-tight hood to ensure proper containment of laser light within the laser workstation cell 30. An optional exhaust system is also illustrated in FIG. 1 and is preferably arranged to enable controlled exhaust of harmful fumes from the interior of the enclosure.

The workpiece unloading section 40 illustrated in FIG. 1 is typically surrounded by a safety fence 28 or other barrier designed to keep personnel out of the operating envelope of the materials handling robot 42. It is contemplated by the present invention that the specific arrangement of the workpiece unloading section 40 may be varied to accommodate different types of workpieces. For example, the materials handling robot 42 and the pass-through enclosure 38 may be replaced by a light-tight conveyor system that feeds directly to the exterior of the workpiece enclosure system 10.

The workpiece unloading section 40 illustrated in FIG. 1 also includes a workpiece inspection station 80 where the workpiece may be inspected for flaws and for conformance with predetermined design parameters. A vision inspection system (not shown) may be provided by mounting a video imaging device proximate the workpiece inspection station 80.

Figure 4:
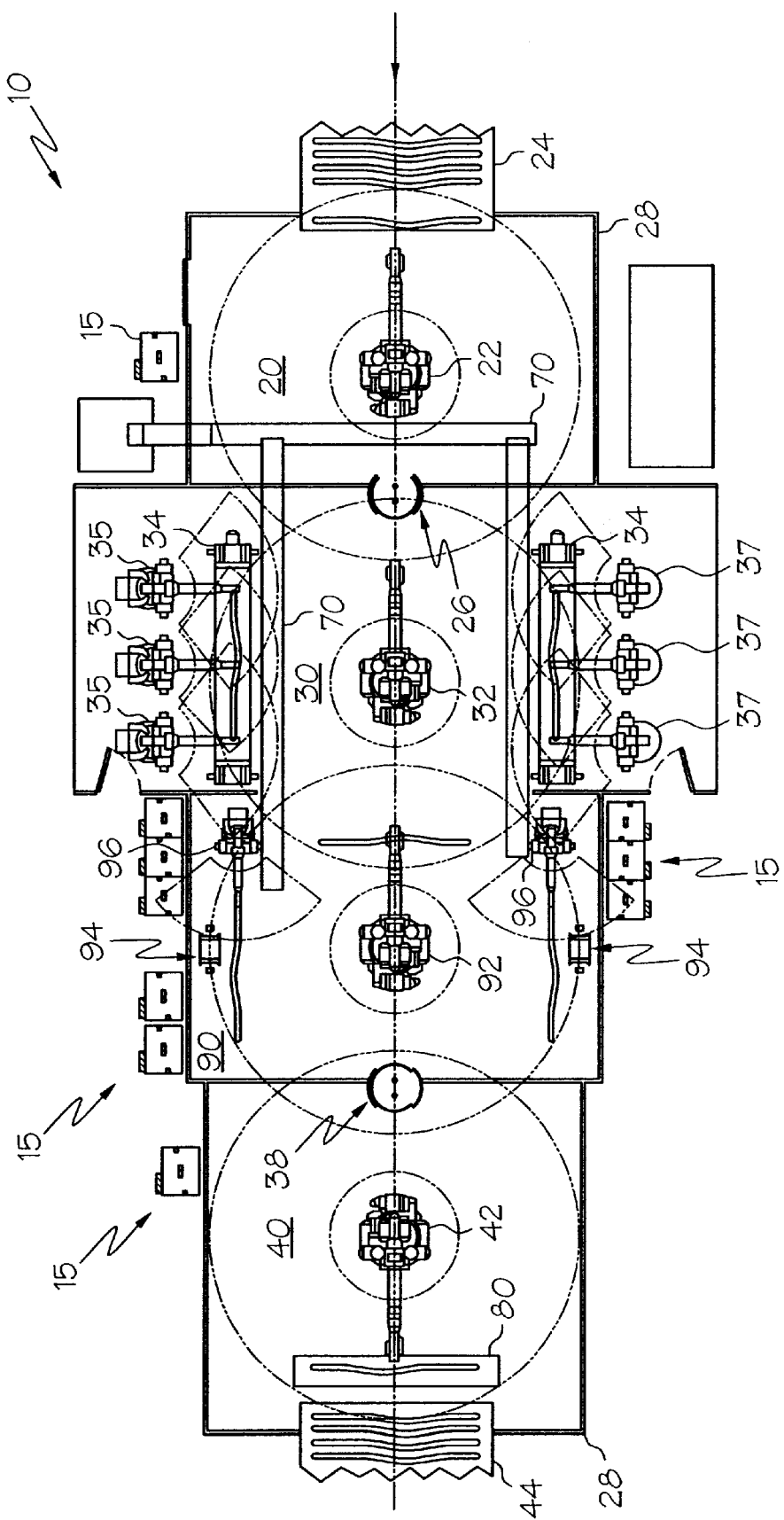
FIG. 4 is an illustration of an alternative enclosure scheme according to the present invention.

Referring now to the embodiment of the present invention illustrated in FIG. 4, the laser workstation cell 30 of the workpiece enclosure system 10 may be expanded to include an end-trimming portion 90. The end trimming portion 90 includes an additional materials handling robot 92 arranged to receive processed workpieces from the previous materials handling robot 32 and move those workpieces to one of two end trimming stations 94 where additional laser-cutting robots 96 are arranged to effect end trimming by additional laser-cutting. The additional materials handling robot 92 is further arranged to move the trimmed workpieces to the pass-through enclosure 38.

The respective operations of the various materials handling robots, laser-cutting robots, and pass-through enclosures of the present invention are controlled by suitable robot controllers 15. The specific structure and design of the laser-cutting robot in the robotic workstations is not the subject of the present invention. A suitable laser-cutting robot is available from Motoman Incorporated, under the product identifier SK16X or SK45XA.

Certain aspects of the laser-cutting system of the present invention may be altered in design without departing from the scope of the present invention. For example, the pass-through doors illustrated in FIG. 3 could be arranged to open and close vertically or radially, as opposed to horizontally. Similarly, maintenance partitions may be provided between the materials handling robot 32 and the scrap conveyors 70. The partitions can be closed to allow personnel to service and program the laser cutting robots at one station while maintaining production on another station. Such partitions may comprise, for example, a powered roller-type door.

Having described the invention in detail and by reference to preferred embodiments thereof, it will be apparent that modifications and variations are possible without departing from the scope of the invention defined in the appended claims. For example, although specific reference has been made herein to laser-cutting applications of the materials handling enclosure system of the present invention, it is contemplated that the enclosure scheme of the present invention will have applications in addition to the specific laser-cutting application discussed herein.

What is claimed is:

1. A workpiece enclosure system for use with robotic workstations configured to perform laser operations on workpieces, the workpiece enclosure system comprising:

first and second light-tight pass-through enclosures, which are movable to permit the workpieces to pass-through the workpiece enclosure system;

a laser workstation cell having a plurality of headstock/tailstock positioners and in communication with the first and second light-tight pass-through enclosures;

a first materials handling robot arranged to move the workpieces to the first light-tight pass-through enclosure;

a second materials handling robot arranged to move the workpieces from the first light-tight pass-through enclosure to one of the plurality of headstock/tailstock positioners, and arranged to move the workpieces from the headstock/tailstock positioners to the second light-tight pass-through enclosure; and a third materials handling robot arranged to move the workpieces from the second light-tight pass-through enclosure.

2. The workpiece enclosure system as recited in claim 1, wherein the plurality of head/tailstock positioners is at least a pair of dual headstock\tailstock positioners.

3. The workpiece enclosure system as recited in claim 1, wherein the first materials handling robot moves the workpieces from an input conveyor to the first light-tight pass-through enclosure.

4. The workpiece enclosure system as recited in claim 1, wherein the third materials handling robot moves the workpieces from the second light-tight enclosure to an output conveyor.

5. The workpiece enclosure as recited in claim 1, wherein the laser workstation cell further comprises:
   at least one scrap chute to receive scrap material generated during the laser operations; and
   at least one scrap conveyor to convey the scrap material to the exterior of the laser workstation cell.

6. The workpiece enclosure as recited in claim 1, further comprising:
   a fourth materials handling robot, wherein the laser workstation cell further comprises at least a pair of end trimming stations, the fourth materials handling robot arranged to receive workpieces from the second materials handling robot and to move the workpieces to one of the end trimming stations and then to the second light-tight pass-through enclosure.

7. The workpiece enclosure as recited in claim 1, wherein the first and second light-tight pass-through enclosures having a fixture for securing the workpiece and are selected from the group consisting of revolving darkroom doors and transfer cabinets.

8. The workpiece enclosure as recited in claim 7, wherein the fixture is stationary.

9. The workpiece enclosure as recited in claim 7, wherein the fixture is rotatable.

10. A workpiece enclosure system for use with robotic workstations configured to perform laser operations on workpieces, the workpiece enclosure system comprising:
    first and second light-tight pass-through enclosures, which are movable to permit the workpieces to pass-through the workpiece enclosure system;
    a laser workstation cell having a plurality of headstock/tailstock positioners and in communication with the first and second light-tight pass-through enclosures; and
    a first materials handling robot arranged to move the workpieces from the first light-tight pass-through enclosure to one of the plurality of headstock/tailstock positioners, and arranged to move the workpieces from the headstock/tailstock positioners to the second light-tight pass-through enclosure.

11. The workpiece enclosure system as recited in claim 10, further comprising a loading zone and a second materials handling robot arranged to move the workpieces from the loading zone to the first light-tight pass-through enclosure.

12. The workpiece enclosure system as recited in claim 10, further comprising a unloading zone and a third materials handling robot arranged to move the workpieces from the second light-tight pass-through enclosure to the unloading zone.

13. The workpiece enclosure system as recited in claim 11, wherein the loading zone is feed by an input conveyor.

14. The workpiece enclosure system as recited in claim 12, wherein the unloading zone feds an output conveyor.

15. The workpiece enclosure as recited in claim 10, wherein the laser workstation cell further comprises:
    at least one scrap chute to receive scrap material generated during the laser operations; and
    at least one scrap conveyor convey the scrap material to the exterior of the laser workstation cell.

16. The workpiece enclosure as recited in claim 10, further comprising:
    a second materials handling robot; and
    at least a pair of end trimming stations provided within the laser workstation cell, wherein the second materials handling robot is arranged to receive workpieces from the first materials handling robot and to move the workpieces to one of the end trimming stations and then to the second light-tight pass-through enclosure.

17. The workpiece enclosure as recited in claim 10, wherein the first and second light-tight pass-through enclosures having a fixture for securing the workpiece and are selected from the group consisting of revolving darkroom doors and transfer cabinets.

18. The workpiece enclosure as recited in claim 17, wherein the fixture is stationary.

19. The workpiece enclosure as recited in claim 17, wherein the fixture is rotatable.

20. A laser-cutting system including a workpiece enclosure system comprising:
    a workpiece loading section;
    a laser workstation cell having a plurality of robotic laser-cutters;
    a workpiece unloading section;
    a first materials handling robot arranged to move workpieces from an input conveyor to a first light-tight pass-through enclosure in communication with the laser workstation cell, wherein the laser workstation cell includes a second materials handling robot arranged to move workpieces from the pass-through enclosure to one of two dual headstock/tailstock positioners for laser culling by the plurality of robotic laser-cutters, and the second materials handling robot is further arranged to move workpieces from the headstock/tailstock positioners to a second pass-through enclosure in communication with the workpiece unloading section; and a third materials handling robot arranged to move workpieces from the second pass-through enclosure to an output conveyor.

* * * * *

UNITED STATES PATENT AND TRADEMARK OFFICE
CERTIFICATE OF CORRECTION

PATENT NO.   : 6,621,091 B2
DATED        : September 16, 2003
INVENTOR(S)  : Prat et al.

It is certified that error appears in the above-identified patent and that said Letters Patent is hereby corrected as shown below:

Column 1,
Line 14, reads as "60/186.736", should read -- 60/186,736 --.

Column 8,
Line 54, reads as "laser culling" should read -- laser cutting --.

Signed and Sealed this

Twenty-second Day of June, 2004

JON W. DUDAS
*Acting Director of the United States Patent and Trademark Office*